(No Model.)

A. H. EMERY.
PIPE JOINT.

No. 279,086.                    Patented June 5, 1883.

Attest
Wm. J. Pannel
[signature]

Inventor
A. H. Emery
By Knight Bros
Attys

UNITED STATES PATENT OFFICE.

ALBERT H. EMERY, OF NEW YORK, N. Y.

PIPE-JOINT.

SPECIFICATION forming part of Letters Patent No. 279,086, dated June 5, 1883.

Application filed April 7, 1883. (No model.)

*To all whom it may concern:*

Be it known that I, ALBERT H. EMERY, of New York, in the State of New York, temporarily residing at Stamford, in the county of Fairfield and State of Connecticut, have invented certain new and useful Improvements in Pipe-Joints, of which the following is a specification.

My improved joint is particularly designed for coupling pipes of large caliber employed for conveying liquid under heavy pressure.

My invention consists, essentially, in the provision of an annular packing, of comparatively soft or ductile metal, placed within a parallel-faced recess or recesses in the end of one or each member or section of the pipe to be coupled, or in an annular flange formed on the interior of a coupling-thimble, which soft-metal packing, when the pipe-sections are forced together, is compressed by a parallel-faced annular tongue or tongues formed opposite the recess or recesses on the other member and entering said recess or recesses. The ductility of the soft metal causes it to adapt itself to the pressure and to flow or pass around the annular recess or recesses, as may be necessary to equalize the pressure on all parts of the joint, thus rendering all parts thereof perfectly tight, and maintaining this tight closure, while the pipe may be deflected more or less out of a straight line. After the packing metal has been inserted in the annular recess or recesses, the pipe ends are then pressed together with sufficient force to compress the metal, as above described, by any suitable means—such, for example, as a thimble having internal screw-threads to engage with corresponding threads formed on the exterior of the pipe-sections.

In order that the invention may be fully understood, I will proceed to describe it with reference to the accompanying drawings, in which—

Figure 1:
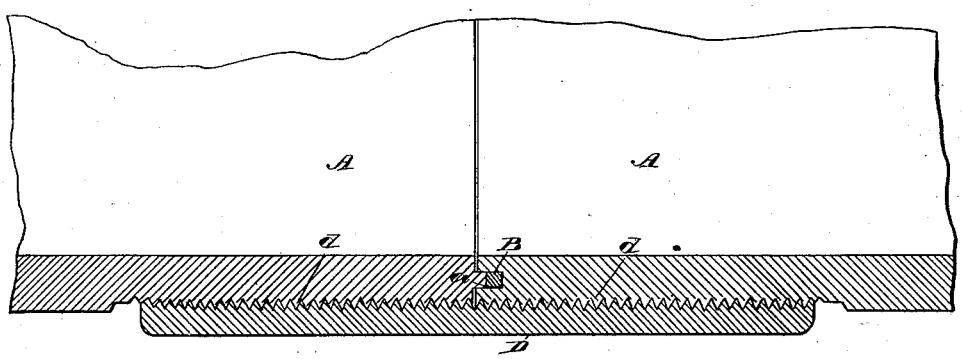
Figure 2:
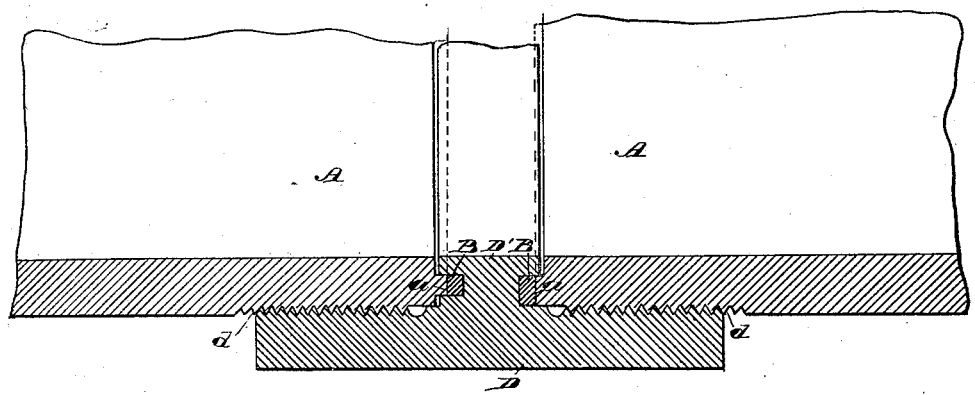

Figure 1 is a longitudinal section of a portion of a pipe-joint embodying my invention. Fig. 2 is a similar view illustrating a modification.

A A represent the two ends or sections of the pipe to be coupled together. As shown in the drawings, each pipe-section is formed with an external screw-thread, *d*, to engage with corresponding screw-threads, *e*, on the interior of the coupling-thimble E. This thimble may be first screwed on one member or section of the pipe, and the other member then screwed into it; or the coupling-thimble may, if preferred, be made with right and left threads to draw the ends together.

B represents cylindrical or annular packings, of soft or ductile metal, contained within a recess or recesses in the face of one or each of the pipe-sections A A, or in a flange, D', formed on the interior of the thimble D, said packings being compressed, when the pipe ends are forced together, by an annular tongue or tongues, *a*, projecting from the face of one or each of the pipe-sections A, and entering and fitting said recess or recesses. If preferred, the tongues may of course be formed on the thimble-flange D' and the recesses in the pipe ends, or one in each. This method of forcing the pipe ends together by means of an external thimble is not essential to the invention, as it is obvious that any other means may be used—such, for example, as the method shown in my application No. 64,868, filed on the 20th June, 1882.

The length of the annular packing-rings is so proportioned to the depth of the recesses that when the packing is fully compressed little or no space will remain between the parallel faces of the pipe ends, so that there may be no danger of the joint becoming weakened by the deflection of the pipe, or from other causes. In cases where the pressure is too heavy to be resisted by lead, copper may be used, or any suitable alloy, either more or less compressible than copper, as the case may require. Where very heavy pressure is to be resisted, bronze or soft steel will be a suitable material for the packing.

The joint constructed as above described is adapted to bear deflection without impairing the joint, and is suitable for pipes intended to sustain very heavy liquid-pressure.

Any deflection which can be sustained by the pipe-sections jointed and coupled together in the manner above described will cause the ductile packing to be squeezed away from that portion where the greatest pressure is sustained, and to flow around in the annular recess, slightly increasing its thickness at other parts, thus equalizing the pressure and maintaining a tight joint at all points.

My invention will thus be seen to differ essentially from the common mode of forming joints between the ends of pipes by the use of washers of flat or other shape simply interposed between said pipe ends.

It is manifest that one or more tongues a may be employed, projecting from each face into grooves in the other, or in the flange of the thimble; but in general a single rigid tongue will be sufficient. Where more than one tongue are used, great care will be necessary to place the requisite quantity of packing metal in each groove, so that an equal pressure shall be applied to all the sealing-rings.

I am aware that a pipe-coupling has before been used with metal packing compressed into a beveled annular groove in one member of the pipe by means of a beveled or wedge-shaped annular tongue on the other member. This, while an effective joint for use under small pressure with cold lead and other still softer material, would not be effective for the particular purpose for which my invention has been devised—namely, the resistance of very heavy pressures sufficient to cause the flow and escape of the packing material if not effectively confined. As it is impossible in compressing the coupling to bring the parts of the pipes to be joined to an absolutely precise bearing, it is essential to my invention that the annular faces of the groove receiving the packing material and of the tongue fitting therein should be parallel, not tapering or beveled, as in the previous device to which I have referred, so that the tongue may fit within the groove so closely as to prevent the outward flow or escape of the packing metal, and cause it to flow around in the groove sufficiently to equalize the pressure at all parts.

Having thus described my invention, what I claim as new, and desire to secure by Letters Patent, is—

The pipe joint or coupling herein described, having a parallel-sided annular recess in the end or face of one member, a corresponding parallel-sided annular tongue on the end or face of the other member, fitting said annular recess, a packing of softer or more ductile metal or other material placed in the said recess, and suitable means for forcing the pipe ends together.

ALBERT H. EMERY.

Witnesses:
HARRY E. KNIGHT,
WM. S. SAYERS.